US007422650B2

(12) United States Patent
McGlinchy

(10) Patent No.: US 7,422,650 B2
(45) Date of Patent: Sep. 9, 2008

(54) METHOD FOR PROCESSING SEALANT OF AN INSULATING GLASS UNIT

(75) Inventor: Timothy Bryan McGlinchy, Twinsburg, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 435 days.

(21) Appl. No.: 11/109,437

(22) Filed: Apr. 19, 2005

(65) Prior Publication Data

US 2005/0178490 A1 Aug. 18, 2005

Related U.S. Application Data

(62) Division of application No. 10/183,775, filed on Jun. 27, 2002, now Pat. No. 6,926,782.

(51) Int. Cl.
*B29C 65/00* (2006.01)
*C03C 27/00* (2006.01)

(52) U.S. Cl. ................ 156/275.5; 156/272.2; 156/109; 156/64

(58) Field of Classification Search .............. 156/272.2, 156/109, 64, 275.5; 356/445, 432
See application file for complete search history.

(56) References Cited

U.S. PATENT DOCUMENTS 4,530,195 A 7/1985 Leopold
4,546,723 A 10/1985 Leopold et al.
4,628,582 A 12/1986 Leopold
4,726,875 A 2/1988 Lenhardt
4,820,365 A * 4/1989 Brumm et al. .............. 156/109
4,988,027 A 1/1991 Bremner
5,051,145 A 9/1991 Lenhardt
5,105,591 A 4/1992 Leopold
5,196,676 A * 3/1993 Hallahan .................... 219/388
5,295,292 A 3/1994 Leopold
5,313,761 A 5/1994 Leopold
5,361,476 A 11/1994 Leopold
5,678,377 A 10/1997 Leopold
6,173,484 B1 1/2001 McGlinchy et al.
6,244,012 B1 6/2001 McGlinchy et al.
6,332,948 B1 12/2001 Lafond
6,397,453 B1 6/2002 McGlinchy et al.
6,438,819 B1 8/2002 McGlinchy et al.

FOREIGN PATENT DOCUMENTS

EP 252066 A * 1/1998

OTHER PUBLICATIONS

Machine Translaiton of EP0252066 Aug. 27, 2007.*

* cited by examiner

*Primary Examiner*—John L. Goff
*Assistant Examiner*—Daniel McNally
(74) *Attorney, Agent, or Firm*—Tarolli, Sundheim, Covell & Tummino LLP

(57) ABSTRACT

A method and apparatus for heating and/or pressing sealant of an insulating glass unit. The apparatus may include an oven and a press. The oven includes a detector that detects an optical property of the insulating glass unit. The detected optical property is used to regulate the amount of energy applied to the insulating glass unit to adjust the amount of energy applied to the sealant. The press may include a displacement transducer that detects a pre-pressed thickness of the insulating glass unit. The measured pre-pressed thickness is used to automatically select a press thickness from a set of pressed IGU thicknesses.

12 Claims, 8 Drawing Sheets

METHOD FOR PROCESSING SEALANT OF AN INSULATING GLASS UNIT

FIELD OF THE INVENTION

The following application is a divisional application of U.S. patent application Ser. No. 10/183,775, now U.S. Pat. No. 6,926,782, filed on Jun. 27, 2002, from which this divisional application incorporates herein by reference in its entirety and claims priority therefrom for all purposes.

BACKGROUND OF THE INVENTION

Construction of insulating glass units (IGU's) generally involves forming a spacer frame by roll-forming a flat metal strip, into an elongated hollow rectangular tube or "U" shaped channel. Generally, a desiccant material is placed within the rectangular tube or channel, and some provisions are made for the desiccant to come into fluid communication with or otherwise affect the interior space of the insulated glass unit. The elongated tube or channel is notched to allow the channel to be formed into a rectangular frame. Generally, a sealant is applied to the outer three sides of the spacer frame in order to bond a pair of glass panes to either opposite side of the spacer frame. Existing heated sealants include hot melts and dual seal equivalents (DSE). The pair of glass panes are positioned on the spacer frame to form a pre-pressed insulating glass unit. Generally, the pre-pressed insulating glass unit is passed through an IGU oven to melt or activate the sealant. The pre-pressed insulating glass unit is then passed through a press that applies pressure to the glass and sealant and compresses the IGU to a selected pressed unit thickness.

Manufacturers may produce IGUs having a variety of different glass types, different glass thicknesses and different overall IGU thicknesses. The amount of heat required to melt the sealant of an IGU varies with the type of glass used for each pane of the IGU. Thicker glass panes and glass panes having low-E coatings have lower transmittance (higher opacities) than a thinner or clear glass pane. (opacity is inversely proportional to transmittance). Less energy passes through a pane of an IGU having a high reflectance and low transmittance. As a result, more energy is required to heat the sealant of an IGU with panes that have higher reflectance and lower transmittance. For example, less energy is required to heat the sealant of an IGU with two panes of clear, single strength glass than is required to heat the sealant of an IGU with one pane of clear, double strength glass and one pane of low-E coated double strength glass.

Typically, manufacturers of insulating glass units reduce the speed at which the insulating glass units pass through the IGU oven to the speed required to heat the sealant of a "worst case" IGU. This slower speed increases the dosage of exposure. In addition to the line speed sacrificed, many of the IGU's are overheated at the surface, resulting in longer required cooling times, and more work in process.

Some manufacturers produce IGUs in small groups that correspond to a particular job or house. As a result, these manufacturers frequently adjust the spacing between rollers of the press to press IGUs having different thicknesses. The thickness of the IGU being pressed is typically entered manually. Other manufacturers batch larger groups of IGUs together by thickness to reduce the frequency at which spacing between the rollers of the press needs to be adjusted.

There is a need for a method and apparatus for heating sealant of an IGU that automatically varies the energy applied to the IGU based on an optical property of the IGU. In addition, there is a need for a method and apparatus that automatically sets the spacing between press rollers for an IGU being pressed. This type of functionality can provide just in time one piece flow production resulting in constant speed, less manual intervention and more consistency in the process.

SUMMARY OF THE INVENTION

The present disclosure concerns a method and apparatus for heating and/or pressing sealant of an insulating glass unit. One aspect of the disclosure concerns an oven for applying energy to an insulating glass unit to heat sealant of the insulating glass unit. The oven includes an optical detector, an energy source, a conveyor, and a controller. The detector detects an optical property of the insulating glass unit. The conveyor moves the insulating glass unit with respect to the energy source. The energy source applies energy to the insulating glass unit to heat the sealant. The controller is coupled to the detector. The controller adjusts the amount of energy supplied by the energy source to the insulating glass unit in response to the detected optical property of the insulating glass unit.

The optical detector may be a transmittance detector and/or a reflectivity detector. In one embodiment, the optical detector is a bar code system that scans a bar code on the insulating glass unit that identifies the type or types of glass used in the insulating glass unit.

In one embodiment, the energy source is a plurality of lamps, such as infrared lamps. The controller may adjust the infrared energy supplied by the energy source by changing a number of the lamps that supply energy to the insulating glass unit, changing the speed of the conveyor or changing the intensity of one or more of the lamps.

In one embodiment, there are two arrays of infrared lamps. The conveyor moves the insulating glass unit between the two arrays of infrared lamps. In one embodiment, the controller activates a different number of lamps in the first array than the controller activates in the second array of lamps when a detected optical property of a first pane of glass of the insulating glass unit is different than a detected optical property of a second pane of glass of the insulating glass unit.

In use, an optical property or type of glass of the insulating glass unit is detected. The conveyor positions the insulating glass unit with respect to the energy source. The amount of energy supplied by the energy source to the insulating glass unit is adjusted in response to the detected optical property or type of glass to heat the sealant of the insulating glass unit. In the exemplary embodiment, the adjustment of energy supplied to the insulating glass unit allows the sealant in a given IGU to be heated more evenly and facilitates more consistent heating of sealant from unit to unit.

A second aspect of the present disclosure concerns a press for an insulating glass unit. The press includes a displacement transducer, a controller and a pair of rollers. The displacement transducer is configured to measure a thickness of an insulating glass unit before it is pressed. The controller is coupled to the displacement transducer. The controller is programmed to compare the measured pre-pressed thickness with a set of programmed ranges of pre-pressed thicknesses that correspond to a set of desired insulating glass unit pressed thicknesses. The controller selects one thickness from the set of insulating glass unit pressed thicknesses that corresponds to the measured pre-pressed thicknesses. The controller is coupled to the pair of rollers that can be spaced apart by a distance determined by the controller. The controller is programmed to set the distance between the rollers to achieve an insulating glass unit pressed thickness that the controller selects based on the measured pre-pressed thickness.

In one embodiment, the displacement transducer is positioned along a path of travel before an oven that heats sealant of the insulating glass unit. In one embodiment, the displacement transducer is a linear variable differential transformer displacement transducer. In one embodiment, the distance between the rollers is controlled by scanning a bar code that indicates the pressed thickness of the insulating glass unit.

In one embodiment, a pre-pressed thickness of an insulating glass unit is measured. The measured thickness is compared with a set of ranges of pre-pressed thicknesses that correspond to a set of insulating glass unit pressed thicknesses. One thickness from the set of insulating glass unit pressed thicknesses is selected that corresponds to the measured pre-pressed thickness. A distance between the rollers of a press is set to achieve the selected insulating glass unit pressed thickness before passing the insulating glass unit is passed through the press.

Additional features of the invention will become apparent and a fuller understanding will be obtained by reading the following detailed description in connection with the accompanying drawings.

DETAILED DESCRIPTION OF THE INVENTION

Figure 2:
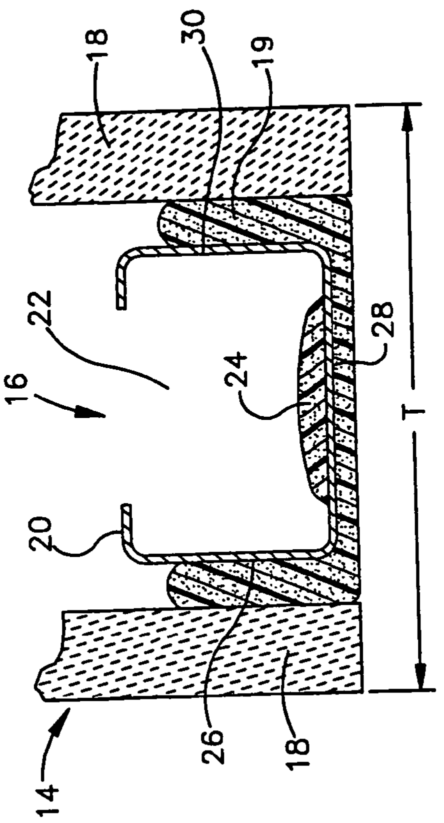
FIG. 2 is a sectional view-taken across lines 2-2 of FIG. 1.
Figure 3:
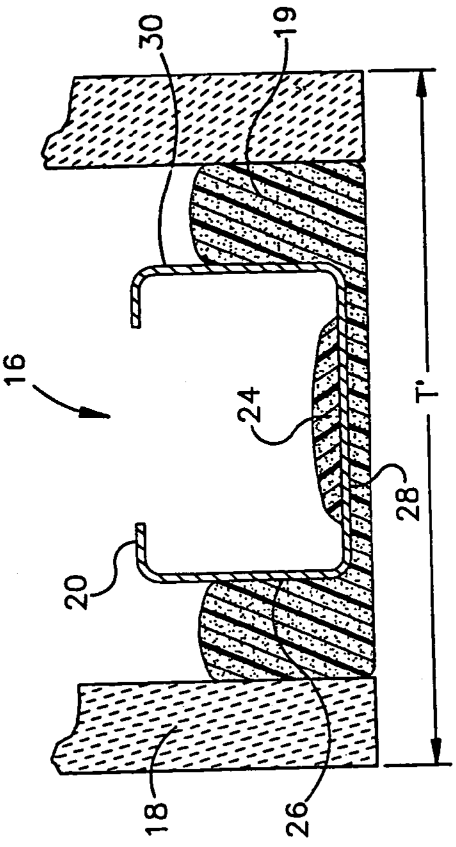
FIG. 3 is a sectional view of an insulating glass unit prior to pressing of the sealant to achieve the insulating glass unit of FIG. 2.
Figure 1:
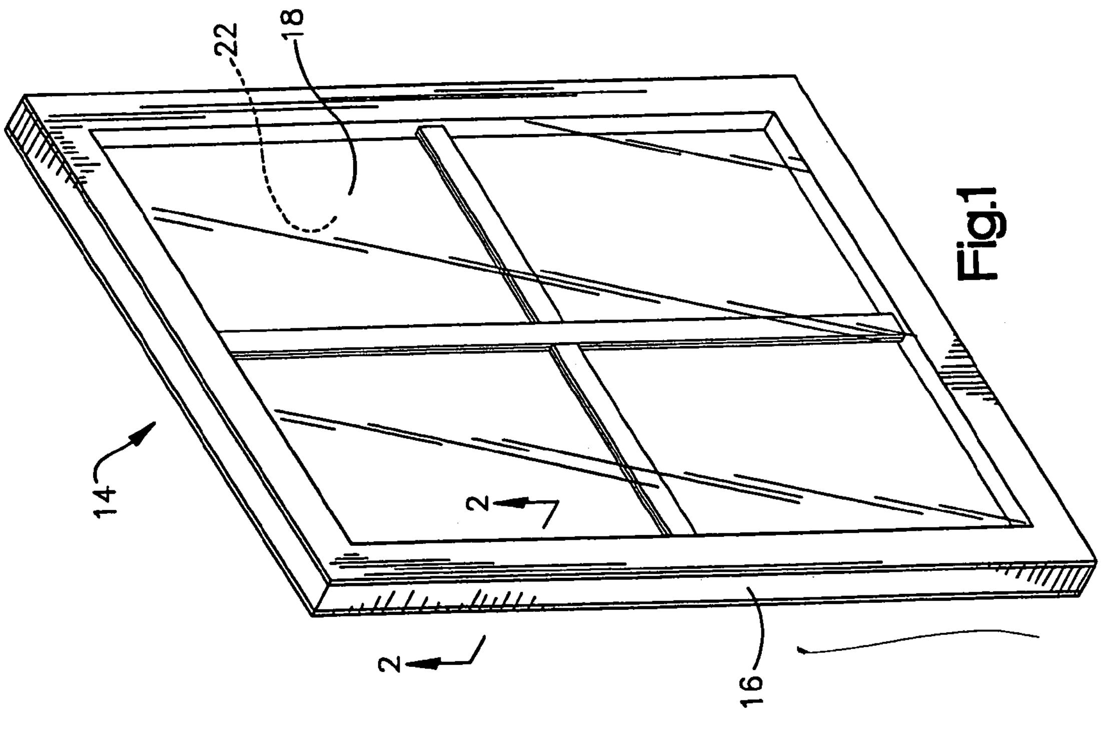
FIG. 1 is a perspective view of an insulating glass unit.

The present disclosure is directed to an apparatus 10 and method for heating and/or pressing sealant 19 of an insulating glass unit 14 (IGU). One type of insulating glass unit 14 that may be constructed with the apparatus 10 is illustrated by FIGS. 1 and 2 as comprising a spacer assembly 16 sandwiched between glass sheets or lites 18. Referring to FIGS. 2 and 3, the illustrated spacer assembly 16 includes a frame structure 20, a sealant material 19 for hermetically joining the frame to the lites 18 to form a closed space 22 within the IGU 14 and a body of desiccant 24 in the space 22. The IGU 14 illustrated by FIG. 1 is in condition for final assembly into a window or door frame, not illustrated, for installation in a building. It is also contemplated that the disclosed apparatus may be used to construct an insulated window with panes bonded directly to sash elements of the window, rather than using an IGU that is constrained by the sash.

It should be readily apparent to those skilled in the art that the disclosed apparatus and method can be used with spacers other than the illustrated spacer. For example, a closed box shaped spacer, any rectangular shaped spacer, any foam composite spacer or any alternative material requiring heating can be used. It should also be apparent that the disclosed apparatus and method can be used to heat and press sealant in insulating glass units having any shape and size.

The glass lites 18 are constructed from any suitable or conventional glass. The glass lites 18 may be single strength or double strength and may include low emissivity coatings. The glass lites 18 on each side of the insulated glass unit need not be identical, and in many applications different types of glass lites are used on opposite sides of the IGU. The illustrated lites 18 are rectangular, aligned with each other and sized so that their peripheries are disposed just outwardly of the frame 20 outer periphery.

The spacer assembly 16 functions to maintain the lites 18 spaced apart from each other and to produce the hermetic insulating dead air space 22 between the lites 18. The frame 16 and sealant 19 coact to provide a structure which maintains the lites 18 properly assembled with the space 22 sealed from atmospheric moisture over long time periods during which the insulating glass unit 14 is subjected to frequent significant thermal stresses. The desiccant body 24 serves to remove water vapor from air or other gases entrapped in the space 22 during construction of the insulating glass unit and any moisture that migrates through the sealant over time.

The sealant 19 both structurally adheres the lites 18 to the spacer assembly 16 and hermetically closes the space 22 against infiltration of air born water vapor from the atmosphere surrounding the IGU 14. A variety of different sealants may be used to construct the IGU 14. Examples include hot melt sealants, dual seal equivalents (DSE), and modified polyurethane sealants. In the illustrated embodiment, the sealant 19 is extruded onto the frame. This is typically accomplished, for example, by passing an elongated frame (prior to bending into a rectangular frame) through a sealant application station, such as that disclosed by U.S. Pat. No. 4,628,528 or co-pending application Ser. No. 09/733,272, entitled “Controlled Adhesive Dispensing,” assigned to Glass Equipment Development, Inc. Although a hot melt sealant is disclosed, other suitable or conventional substances (singly or in combination) for sealing and structurally carrying the unit components together may be employed.

Referring to FIGS. 2 and 3, the illustrated frame 20 is constructed from a thin ribbon of metal, such as stainless steel, tin plated steel or aluminum. For example, 304 stainless steel having a thickness of 0.006-0.010 inches may be used.

The ribbon is passed through forming rolls (not shown) to produce walls 26, 28, 30. In the illustrated embodiment, the desiccant 24 is attached to an inner surface of the frame wall 26. The desiccant 24 may be formed by a desiccating matrix in which a particulate desiccant is incorporated in a carrier material that is adhered to the frame. The carrier material may be silicon, hot melt, polyurethane or other suitable material. The desiccant absorbs moisture from the surrounding atmosphere for a time after the desiccant is exposed to atmosphere. The desiccant absorbs moisture from the atmosphere within the space 22 for some time after the IGU 14 is fabricated. This assures that condensation within the unit does not occur. In the illustrated embodiment, the desiccant 24 is extruded onto the frame 20.

To form an IGU 14 the lites 18 are placed on the spacer assembly 16. The IGU 14 is heated and pressed together to bond the lites 18 and the spacer assembly 16 together.

Figure 4:
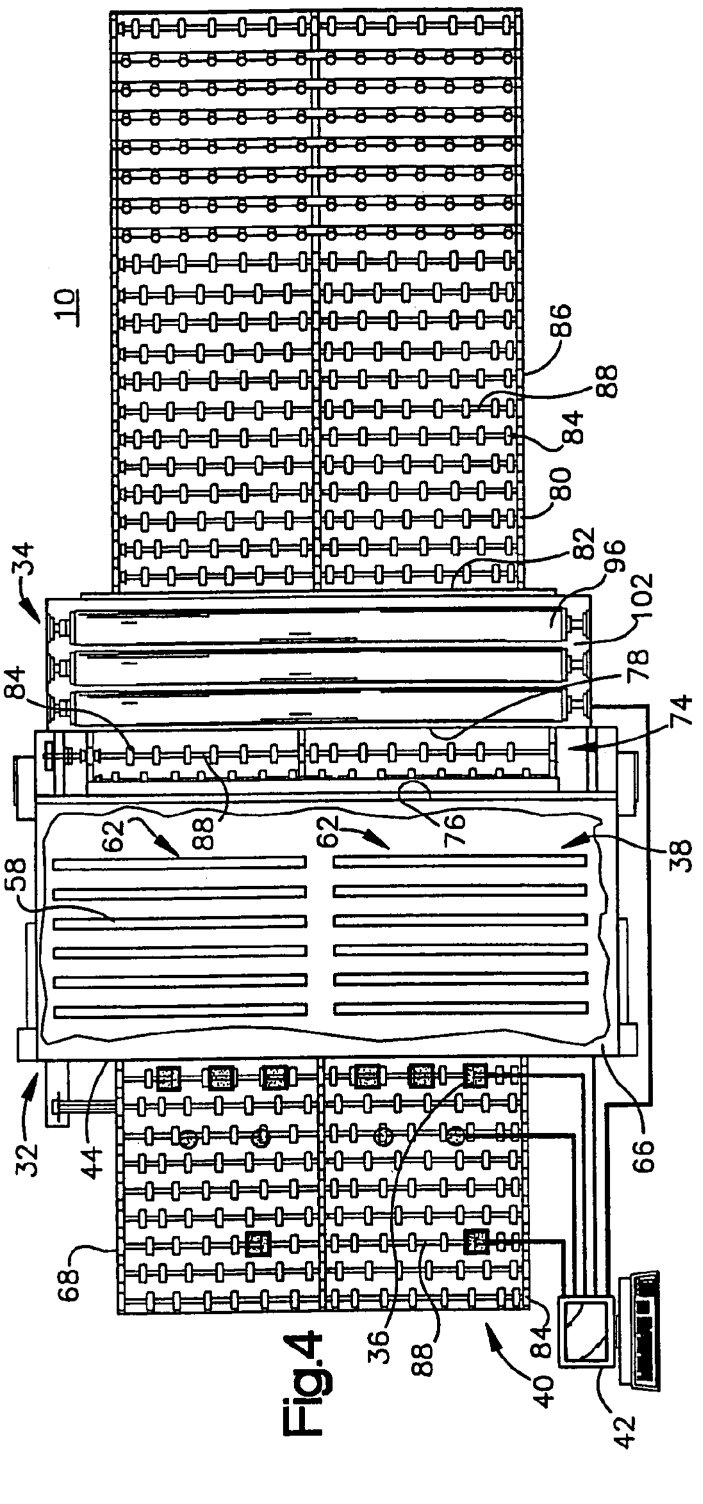
FIG. 4 is a top plan view of an apparatus for heating and pressing sealant of an insulating glass unit.
Figure 5:
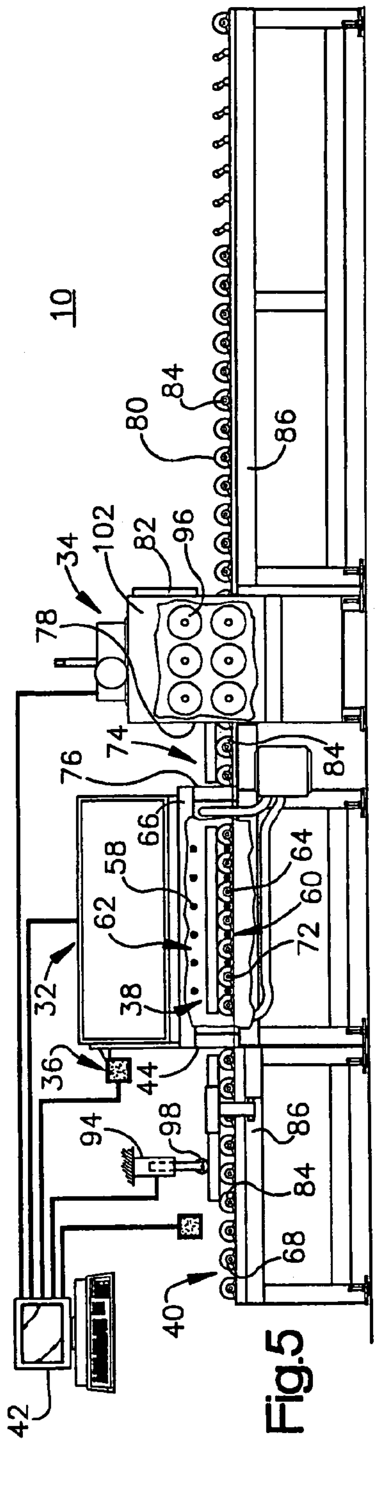
FIG. 5 is a side elevational view of an apparatus for heating and pressing sealant of an insulating glass unit.

Referring to FIGS. 4 and 5, the illustrated apparatus 10 for heating and pressing sealant 19 of an IGU 14 includes an oven 32 for heating the sealant 19 of an IGU 14 and a press 34 for applying pressure to the sealant 19 and compressing the IGU 14 to the desired thickness T (FIG. 2).

Oven

Referring to FIGS. 4-7, the illustrated oven 32 includes a detector 36, an energy source 38, a conveyor 40 and a controller 42. The detector 36 is used to detect an optical property of the IGU 14 and/or the type of glass used to construct the IGU. The energy source 38 applies energy to the IGU 14 to heat or activate the sealant 19. The conveyor 40 moves the IGU 14 with respect to the energy source 38. The controller 42 is coupled to the detector 36 and adjusts the amount of energy supplied by the energy source 38 to the IGU 14 in response to the detected optical property or glass type of the IGU 14 to heat the sealant 19 of the IGU 14.

Figure 6:
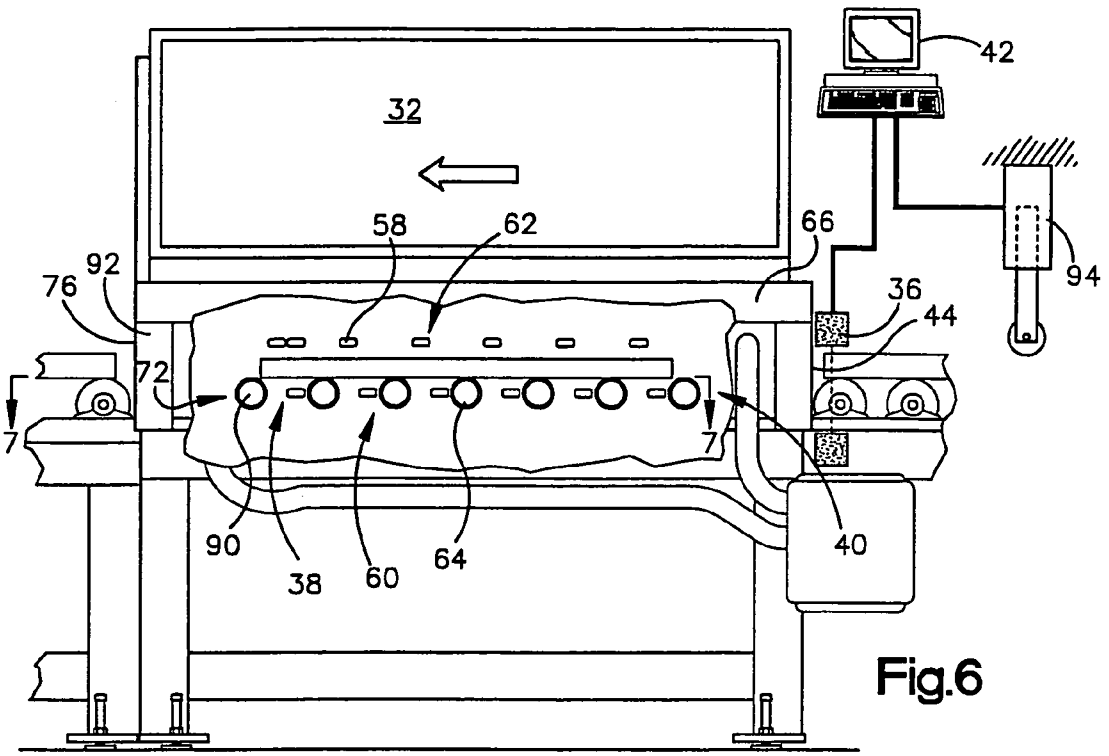
FIG. 6 is a side elevational view of an oven for applying energy to sealant of an insulating glass unit with a side portion removed.

Referring to FIGS. 4-6, the detector 36 is mounted along a path of travel defined by the conveyor 40 before an inlet 44 of the oven 32. Positioning the detector 36 before the inlet 44 of the oven 32 allows an optical property of the IGU 14 to be detected before the IGU 14 enters the oven 32. In the illustrated embodiment, a plurality of detectors 36 are included for detecting an optical property along a width of an IGU 14. It should be readily apparent to those skilled in the art that any desired number of detectors could be used.

Figure 10:
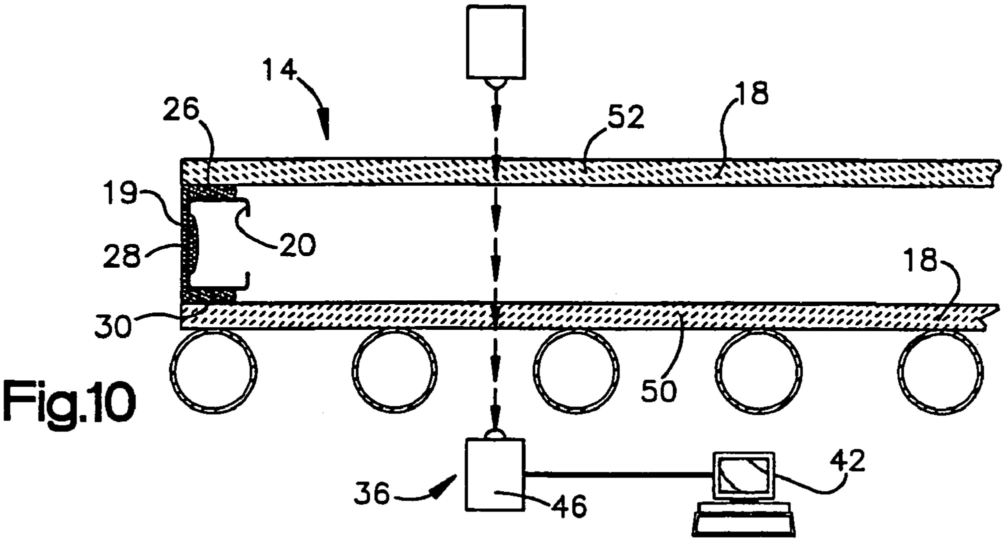
FIG. 10 is a schematic representation of a transmittance detector detecting a transmittance of an insulating glass unit.
Figure 12:
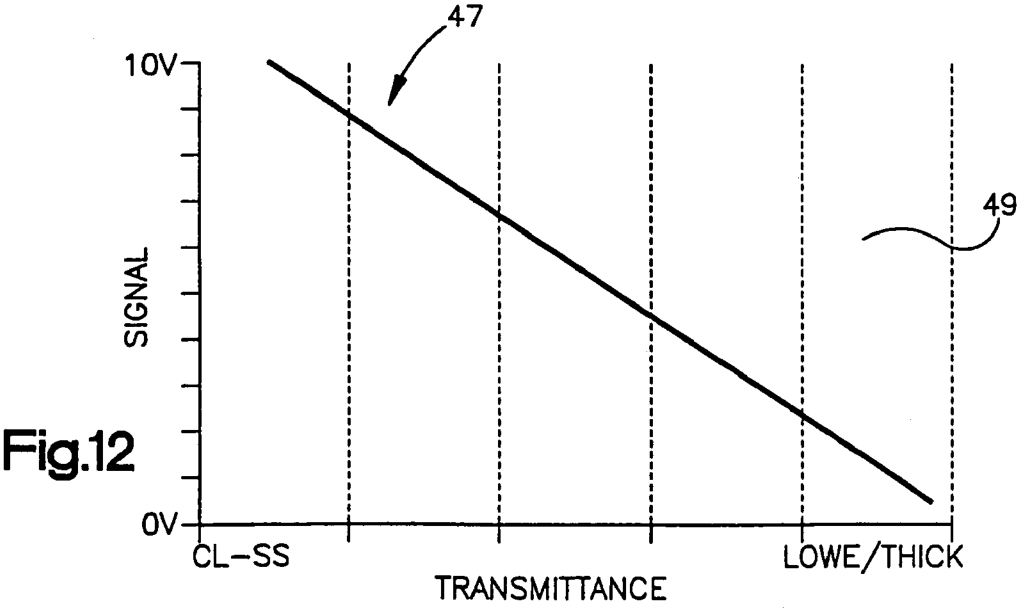
FIG. 12 is a graph that plots the relationship between signal strength of a transmittance detector versus transmittance.

The amount of energy required to heat the sealant 19 of an IGU 14 varies depending on the optical properties of the IGU 14. Referring to FIGS. 10 and 12, in one embodiment, a transmittance detector 46 is used to determine the amount of energy required to heat the sealant 19 of the IGU 14. One acceptable transmittance detector is an Allen Bradley series 5000 photo switch analog control, such as Allen Bradley part number 42DRA-5400. An IGU that is less transmissive to infrared light requires more energy (infrared light in the illustrated embodiment) to heat the sealant 19 than an IGU that is more transmissive to infrared light. For example, an IGU 14 that includes two panes of clear, single strength glass is more transmissive than an IGU that includes two panes of clear, double strength glass. As a result, more energy is required to heat the IGU with two panes of clear, double strength glass than the IGU with two panes of clear, single strength glass. Similarly, an IGU having one pane of low-E coated double strength glass and one pane of clear double strength glass is less transmissive and requires more energy to heat the sealant 19 than an IGU that includes two panes of clear, double strength glass. An IGU that includes two panes of low-E glass is less transmissive than an IGU that includes one pane of clear glass and one pane of low-E coated glass. As a result, more energy is required to heat the sealant 19 of the IGU having two panes of low-E coated glass.

The energy required to heat the sealant 19 of an IGU having any combination of glass types can be determined by detecting the transmittance of the IGU 14. The transmittance detector 46 provides a signal to the controller 42 that the controller uses to adjust the amount of energy supplied to the IGU 14 for heating the sealant 19. Referring to FIG. 12, in the illustrated embodiment, the transmittance detector provides a voltage signal to the controller. The magnitude of the voltage signal decreases as transmittance decreases.

Figure 11:
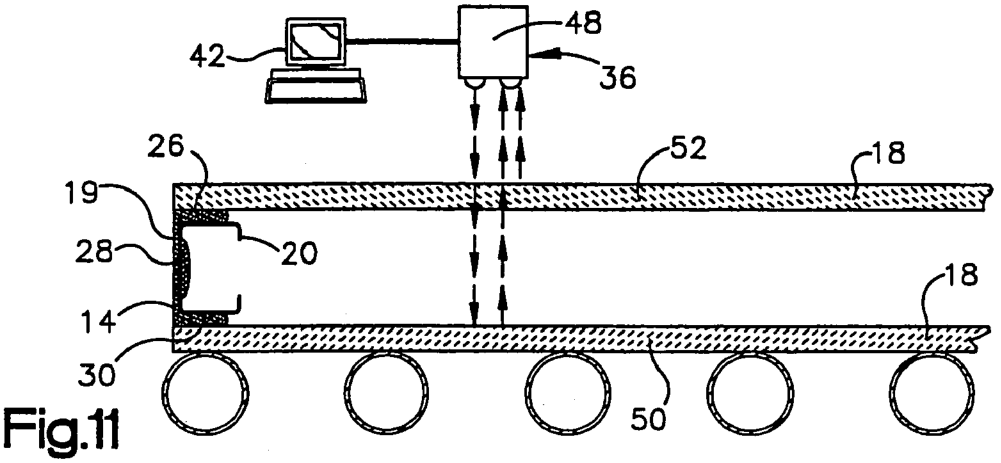
FIG. 11 is a schematic representation of a reflectivity detector detecting the reflectivity of an insulating glass unit.
Figure 13:
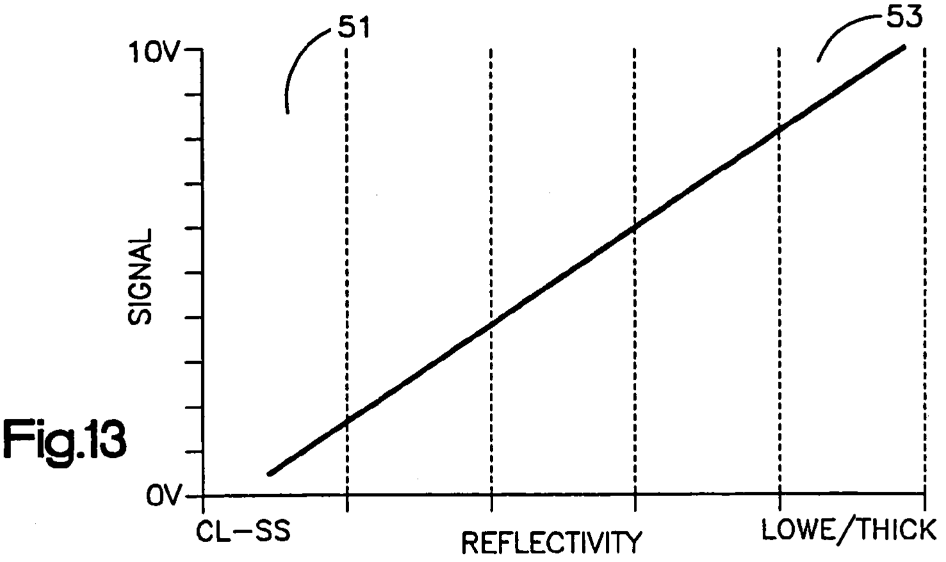
FIG. 13 is a graph that plots signal strength of a reflectivity detector versus reflectivity.

Referring to FIGS. 11 and 13, a reflectivity detector 48 is used to detect the amount of energy required to heat the sealant 19 of the IGU 14. Acceptable reflectivity detectors include model number 0CH20, available from Control Methods, model number NTL6 available from Sich, and model number LX2-13/V10W available from Keyence. An IGU 14 having a high reflectivity requires more energy to heat the sealant 19 than an IGU 14 having a low reflectivity. For example, an IGU 14 having two panes of clear glass is less reflective than an IGU 14 having one pane of clear glass and one pane of low-E coated glass. As a result, the IGU 14 having two panes of clear glass requires less energy to heat the sealant 19 than the IGU 14 having one pane of clear glass and one pane of low-E glass. Similarly, an IGU 14 having two panes of low-E coated glass is more reflective than an IGU 14 having one pane of clear glass and one pane of low-E coated glass. As a result, more energy is required to heat the IGU 14 having two panes of low-E coated glass. The reflectivity detector provides a signal to the controller 42 that the controller uses to adjust the amount of energy supplied to the IGU 14 for heating the sealant 19. Referring to FIG. 13, in the illustrated embodiment, the reflectivity detector provides a voltage signal to the controller. The magnitude of the voltage signal increases as reflectivity increases.

In one embodiment, an optical property of a lower pane 50 and an optical property of an upper pane 52 is detected. The amount of energy required to heat the sealant 19 to the lower pane 50 may be different than the amount of energy required to heat the sealant 19 to the upper pane 52, if the optical properties of the lower pane 50 are different than the optical properties of the upper pane 52. If the lower pane 50 is more opaque or reflective than the upper pane 52, more energy is required to heat the sealant 19 to the lower pane 50 than the upper pane 52. For example, the lower pane 50 may be a low-E coated piece of glass and the upper pane 52 is a clear piece of glass. The low-E coated glass lower pane 50 requires more energy to heat the sealant 19. In this embodiment, a combination of transmittance and reflectivity detectors may be used. For example, a transmittance detector may be located either above or below the path of travel of the IGU to detect the amount of light that passes through the IGU. First and second reflectivity detectors may be positioned above and below the path of travel to detect the amount of light reflected by each side of the IGU. This information may be used to determine the type of glass the upper pane is made from and the type of glass the lower pane is made from.

In an alternate embodiment, the type of glass of the upper pane and lower pane are detected using one or more vision sensors. In this embodiment, the vision sensor detects the hew, color and brightness of the IGUs. In the exemplary embodiment, the ambient light and background are constant. The optical properties detected by the vision sensor are used to determine the type of glass the upper pane is made from and the type of glass the lower pane is made from.

Figure 15:
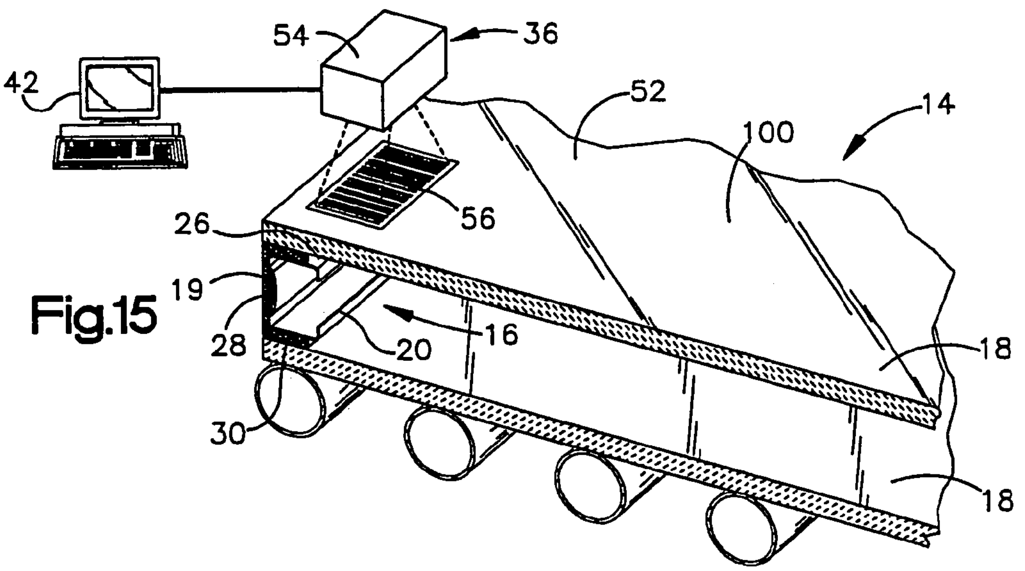
FIG. 15 is a schematic perspective representation of a bar code reader reading a bar code on an insulating glass unit.

Referring to FIG. 15, in one embodiment the detector 36 is a bar code reader 54 that is used to determine the type of glass of each lite of the IGU and the pressed thickness of the IGU.

In the exemplary embodiment, the bar code reader 54 is part of a bar code system. The system includes the bar code reader 54, a CPU and a database that identifies different IGU configurations that correspond to different bar codes. The bar code identifies one or more optical properties of the IGU 14. A bar code read by the reader 54 is processed by the CPU that accesses the database to determine the type of glass of each pane of the given IGU and the pressed thickness of the IGU. In this embodiment, a bar code label 56 is affixed to a lite 18 of the IGU 14. For example, the bar code label 56 for a given IGU 14 might indicate that the lower pane 50 is low-E coated double strength glass and the upper pane 52 is clear single strength glass and the pressed IGU thickness is 0.750 inches. In one embodiment, the bar code label identifies the complete construction details of the IGU. For example, the bar code may identify the glass type, glass thickness, spacer type, spacer width, muntin configuration, sealant type, sealant amount, and all other construction details of the IGU.

Referring to FIGS. 4-7, the illustrated energy source 38 comprises a plurality of elongated infrared radiating (IR) lamps 58. One acceptable IR lamp is a Hareaus IR emitter, available from Glass Equipment Development under the part number 100-3746. As seen most clearly in FIG. 4, there are two side by side lower arrays 60 of IR lamps that extend across a width of an oven housing that supports the lamps. Similarly, as seen in the top view of FIG. 4, two side by side upper arrays 62 of IR lamps apply infrared light to heat the IGU from above. In the illustrated embodiment, the lower arrays 60 are adjacent to one another and the upper arrays 62 are adjacent to one another as illustrated by FIG. 4. In the exemplary embodiment, each of the lamps 58 are independently controlled. Each lamp may be independently turned on and off in the exemplary embodiment. In one embodiment, the intensity of each lamp is individually controllable. In the illustrated embodiment, each lamp 58 of the lower arrays 60 is positioned between a roller 64 of the conveyor 40 that is located inside an oven housing 66. Each of the lamps 58 of the upper arrays 62 are located in the oven housing 66 above the conveyor 40. The upper and lower arrays on the two sides of the oven can be operated independently of each other. This independent array energization is useful when smaller IGUs 14 are being processed. A first IGU 14 may be positioned on the left side of the oven 32 while a second IGU 14 is placed on the right side of the oven 32. The lamps on the left side of the oven apply heat to the IGU 14 on the left side of the oven 32 and the lamps on the right side of the oven 32 apply heat to the IGU 14 on the right side of the oven 32.

The arrays of lamps on the left and right side of the oven 32 can be operated in unison when a larger IGU 14 is being heated that spans both the left and the right sides of the oven 32.

The lamps of the lower arrays 60 can be operated in unison with the upper arrays 62 or the lower arrays 60 may be operated independently of the upper arrays 62. The lamps of the lower arrays 60 may be operated independently from the upper arrays 62 when the detector 36 detects two different types of lites 18 in the IGU 14.

Figure 16:
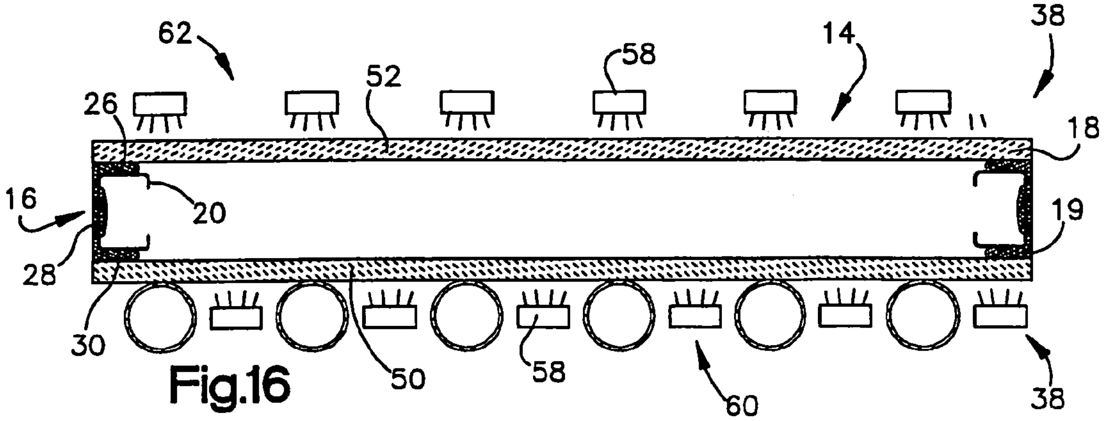
FIG. 16 is a schematic representation of infrared lamps applying energy to sealant of an insulating glass unit.

FIG. 16 shows a lower array 60 and an upper array 62 of IR lamps 58 that are all applying energy to the IGU 14. In the exemplary embodiment, all the IR lamps 58 of the upper array 60 and the lower array 62 apply energy to the IGU 14 when the detector 36 detects an IGU 14 that is relatively opaque or reflective and, as a result, requires more energy to heat the sealant 19.

Figure 17:
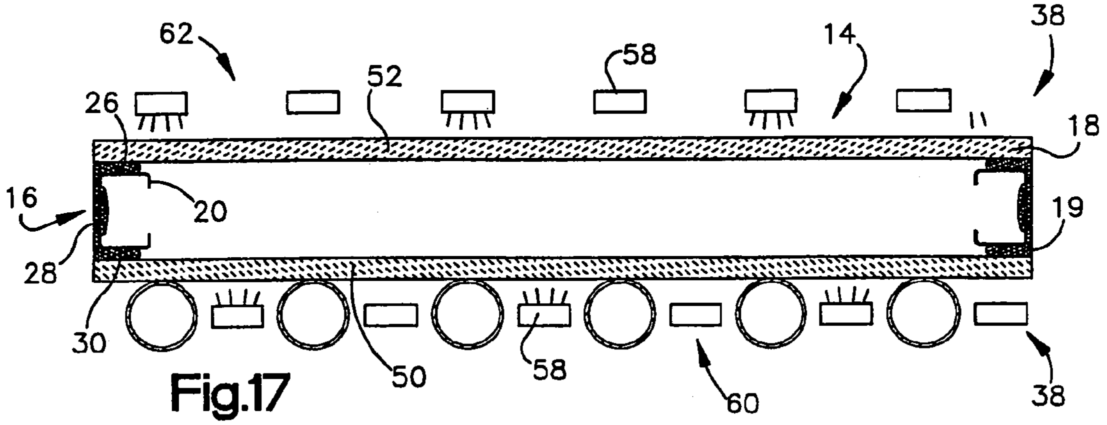
FIG. 17 is a schematic representation of infrared lamps applying energy to sealant of an insulating glass unit showing an alternate lamp energization sequence; and, FIG. 18 is a schematic representation of infrared lamps applying energy to sealant of an insulating glass unit showing an alternate lamp energization sequence.

FIG. 17 shows an upper array 62 and a lower array 60 of IR lamps 58 wherein half of the IR lamps 58 of the upper array 62 and the lower array 60 supply energy to the IGU 14 to heat the sealant 19. FIG. 17 is illustrative of the number of lamps that may be activated when the detector 36 detects an IGU 14 that is more transmissive or less reflective and requires less energy to heat the sealant 19.

Figure 18:
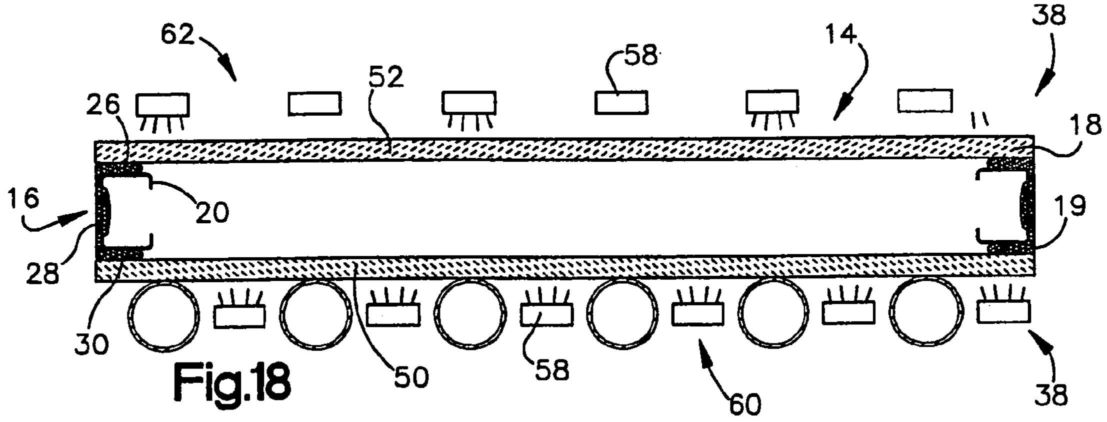

FIG. 18 illustrates a lower array 60 with all of the IR lamps 58 supplying energy to the lower pane 50 of the IGU 14 to heat the sealant 19 and half of the IR lamps 58 of the upper array 62 suppling energy to the upper pane 52 of the IGU 14. The IR lamps 58 of the upper array 62 and lower array 60 may be operated in this manner when the detector 36 detects an IGU 14 having a more opaque or reflective lower pane 50 that requires more energy to heat the sealant 19 and a transmissive or less reflective upper pane 52 that requires less energy to heat the sealant 19. It should be apparent to those skilled in the art that any number of lamps in the upper array 62 or the lower array 60 can be turned on to supply energy to the IGU 14 in response to detected optical properties.

In one embodiment, the oven includes one or more sensors that detect the leading and trailing edges of the IGU being heated. Each lamp that supplies energy to a given IGU may turn on when the leading edge of the IGU reaches the lamp and each lamp may turn off when the trailing edge passes the lamp. This is referred to as shadowing the IGU.

Referring to FIGS. 4-7, the illustrated conveyor 40 includes four sections that move IGUs 14 through the apparatus 10 for heating sealant 19. The sections include an inlet conveyor 68 that supplies IGUs 14 to an inlet 44 of the oven 32. An oven conveyor 72 that moves IGUs 14 through the oven 32, a transition conveyor 74 that moves IGUs 14 from an outlet 76 of the oven 32 to an inlet 78 of the press 34 and an outlet conveyor 80 that moves pressed IGUs 14 away from the outlet 82 of the press 34. It should be readily apparent to those skilled in the art that any suitable conveyor configuration could be employed.

Figure 7:
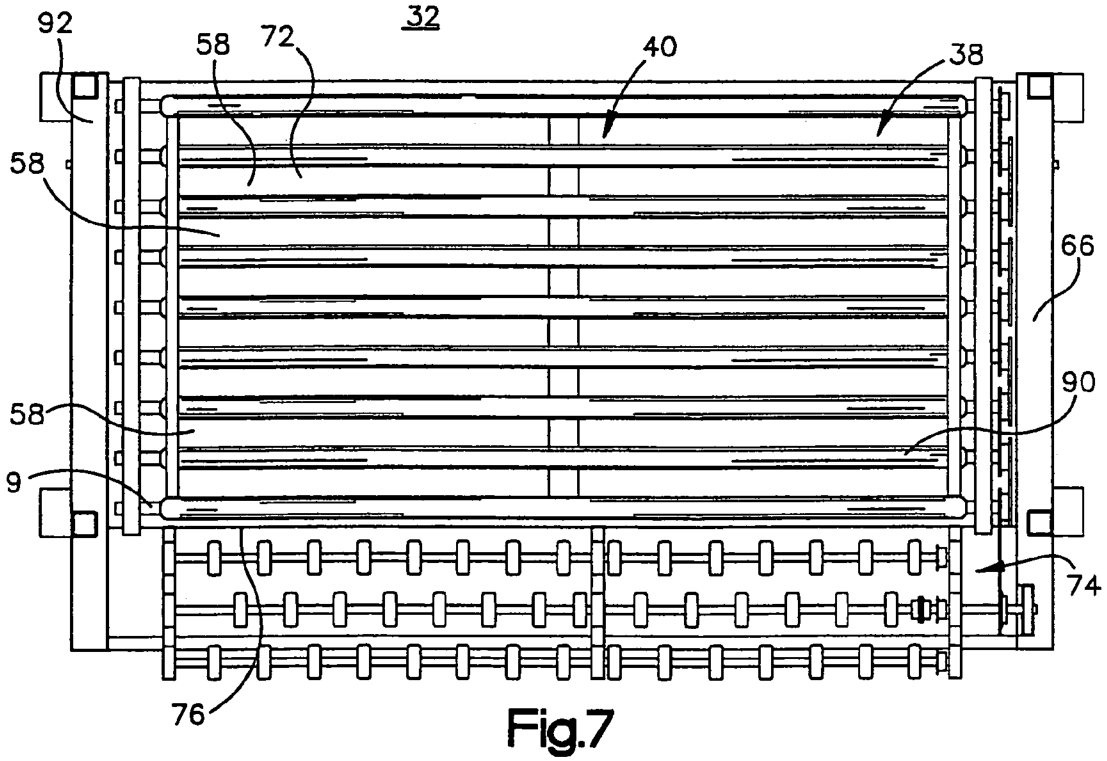
FIG. 7 is a top plan view of an oven for applying energy to sealant of an insulating glass unit with a top portion removed.

In the illustrated embodiment, the inlet conveyor 68, transition conveyor 74 and outlet conveyor 80 each comprise a plurality of drive wheels 84. The drive wheels 84 are rotatably connected to a conveyor table 86 by drive rods 88. Referring to FIGS. 6 and 7, the oven conveyor 72 comprises elongated driven rollers 90 that are rotatably mounted to a support housing 92 of the oven 32. The driven rollers 90 are positioned adjacent to the infrared lamp 58 of the lower arrays 60. In the exemplary embodiment, the conveyor 40 is operated to move an IGU 14 along a path of travel through the oven 32, to the press 34, and away from the press at a constant speed. In an alternate embodiment, the speed of the conveyor 40 is controlled by the controller 42 in response to a signal from the detector 36 to vary the amount of energy supplied to the IGUs 14 that pass through the oven 32.

In the illustrated embodiment, the controller 42 is coupled to the oven 32, the press 34, the detector 36 and the conveyor 40. The controller 42 receives a signal from the detector 36 that is indicative of an optical property or glass type of the IGU 14 and adjusts the amount of energy supplied by the oven 32 to the IGU 14 in response to the detected optical property or glass type. Referring to FIGS. 10 and 12, when a transmittance detector 46 is used, the signal provided by the transmittance detector 46 varies with the detected transmittance of the IGU 14. Referring to FIG. 12, a higher output voltage provided by the transmittance detector to the controller 42 indicates a high transmittance. A lower output voltage by the transmittance detector to the controller 42 indicates that a more opaque IGU 14 has been detected by the transmittance detector.

In the exemplary embodiment, the controller compares the signal provided by the transmittance detector to stored values or ranges that correspond to various IGU glass configurations. For example, referring to FIG. 12, the signal provided by the transmittance detector may fall within range 47, indicating an IGU having clear, single strength lites is being processed. As a second example, the signal may fall within range 49, indicating that the IGU being processed has two lites made from double strength low-E glass. Each possible glass configuration may be detected by the controller in this manner.

Referring to FIGS. 11 and 13, when a reflectivity detector 48 is used, a signal is provided by the reflectivity detector 48 that is indicative of the reflectivity of the IGU 14. A lower voltage output signal provided by the reflectivity detector 48 to the controller 42 indicates that a less reflective IGU 14 is being processed. A higher voltage output signal from the reflectivity detector 48 indicates that a more reflective IGU 14 is being processed.

In the exemplary embodiment, the controller compares the signal provided by the reflectivity detector to stored values or ranges that correspond to different IGU glass configurations. For example, referring to FIG. 13, the signal provided by the reflectivity detector may fall within range 51, indicating an IGU having clear, single strength glass is being constructed. As a second example, the signal may fall within range 53, indicating that the IGU being processed has two lites made from single to double strength, low-E glass. Each possible glass configuration can be detected and classified by the controller in this manner. In one embodiment, a combination of reflectivity and transmittance detectors are used. For example, on transmittance detector, a reflectivity detector above the IGU path and a reflectivity detector below the IGU path may be used.

Referring to FIG. 15, when a bar code reader 54 is used, the bar code reader provides a signal to the controller 42 that indicates the glass type(s)of the IGU 14. In the exemplary embodiment, the signal provided by the bar code reader 54 to the controller 42 indicates the type of glass used for the lower pane 50 and the type of glass being used as the upper pane 52.

In the exemplary embodiment, the controller 42 uses the signal from the detector 36 to adjust the amount of energy supplied by the IR lamp 58 required to bring the sealant 19 of the IGU 14 to a proper melt temperature. In the exemplary embodiment, the controller 42 adjusts the amount of energy supplied by the IR lamps 58 by changing the number of lamps in the lower arrays 60 and upper arrays 62 that supply energy to the IGU 14. FIG. 16 illustrates all lamps of an upper array 62 and a lower array 60 providing energy to heat the sealant 19 of the IGU 14. The controller 42 would cause all the R lamps 58 of the lower array 60 and the upper array 62 to supply energy to the IGU 14 when the signal provided by the detector 36 indicates that the IGU 14 is relatively opaque or reflective. If the detector 36 is configured to detect the type of glass that the lower lite 50 and the upper lite 52 is made from, the controller 42 would cause all the IR lamps 58 of the lower array 60 and the upper array 62 to supply energy to the IGU 14 when the signal provided by the detector 36 indicates that the glass of the lower pane 50 and the glass of the upper pane 52 is relatively opaque or reflective.

FIG. 17 shows half of the IR lamps 58 of an upper array 62 and a lower array 62 supplying energy to heat the sealant 19 of the IGU 14. If the detector 36 is configured to detect overall transmittance of the IGU being processed, the controller 42 shuts off some of the IR lamps 58 in the upper array 62 and the lower array 60 when the signal provided by the detector 36 to the controller 42 indicates that the IGU 14 is more transmissive or less reflective. If the detector 36 is configured to detect the type of glass that the lower lite 50 and the upper lite 52 is made from, the controller 42 would shut off some of the IR lamps 58 of the lower array 60 and the upper array 62 when the detector 36 indicates that the glass of the lower pane 50 is more transmissive or less reflective and the glass of the upper pane 52 is more transmissive or less reflective.

FIG. 18 illustrates an upper array 62 with some of the IR lamps 58 applying energy to the IGU 14 for heating the sealant 19 and some of the IR lamps 58 turned off and all of the lamps of the lower array 60 turned on. In the exemplary embodiment, when the detector is configured to detect the type of glass that is used for the upper lite 52 and the type of glass that is used for the lower lite 50 the controller can supply different amounts of energy from above and below the IGU. For example, in FIG. 18, the controller 42 turns all of the lamps that supply energy to one side of the IGU 14 on when the signal from the detector 36 indicates that the pane is relatively opaque or reflective and turns some of the lamps of the second array off when the signal from the detector 36 to the controller indicates that the other pane of the IGU 14 is more transmissive or less reflective. The detector 36 may include transmittance detectors and reflectivity detectors that provide signals to the controller 42 that allow the controller 42 to determine which pane of the IGU 14 is more opaque or reflective. When a bar code reader is used to detect the types of glass used in the IGU 14 the signal provided from the bar code reader to the controller 42 allows the controller 42 to determine which pane of the IGU 14 requires more energy to heat the sealant 19 of the IGU 14.

In the exemplary embodiment, the controller 42 operates the arrays on the left side of the oven 32 independently of the arrays on the right side of the oven 32 when the IGUs 14 being processed do not overlap both arrays. In the exemplary embodiment, the controller 42 operates on the left and right side of the oven 32 when the IGU 14 being processed overlaps both arrays.

Press

IGUs 14 are provided by the conveyor 40 from the oven 32 to the press 34. In the illustrated embodiment, the press 34 includes a displacement transducer 94 and adjustable pressing members 96 that are coupled to the controller 42. In an alternate embodiment, the displacement transducer is omitted when a bar code reader 54 is included. In this embodiment, the bar code includes the pressed IGU thickness which is used by the controller to set the press spacing.

Figure 14:
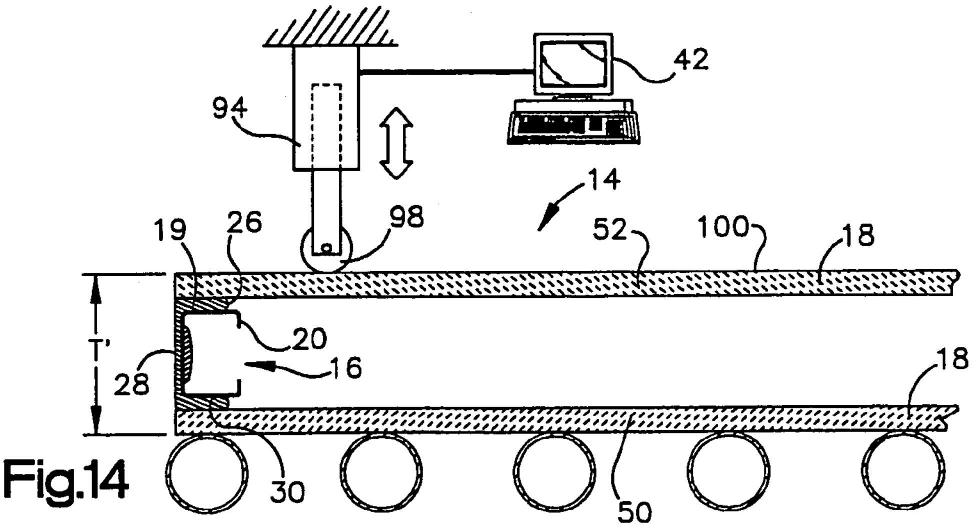
FIG. 14 is a schematic representation of a linear variable differential transformer measuring a thickness of an insulating glass unit prior to its passage through the press.

The illustrated pressing members 96 are elongated rollers. However, it should be readily apparent to those skilled in the art that other pressing means, for example, adjustable belts could be used in place of rollers. Referring to FIGS. 3, 5 and 14, the displacement transducer 94 is mounted above the conveyor 40 before the inlet 44 to the oven 32 in the illustrated embodiment. It should be apparent to those skilled in the art that the displacement transducer 94 could be positioned at any point before the inlet 78 to the press 34. The displacement transducer 94 includes a roller 98 that engages an upper surface 100 of the IGU 14. The displacement transducer 94 measures a pre-pressed thickness T' of IGUs 14. The displacement transducer 94 provides a signal to the controller 42 that indicates the pre-pressed thickness T' of the IGU 14. It should be apparent to those skilled in the art that the pre-pressed thickness T' of the IGU 14 could be manually entered to the controller 42 or, when a bar code reader 54 is included, the IGU 14 thickness T is included in the bar code.

The controller 42 is coupled to the displacement transducer 94. The controller 42 is programmed to compare the measured pre-pressed thickness T' of the IGU 14 with a stored set of ranges of pre-pressed thicknesses T' that correspond to a set of IGU 14 pressed IGU thicknesses T. The pressed IGU thickness T is the final thickness of a pressed IGU. The controller 42 selects one pressed thickness T from the set of IGU 14 pressed thicknesses that corresponds to the pre-pressed thickness T' measured by the transducer 94.

For example, pre-pressed IGUs 14 having pre-pressed thicknesses ranging from 0.790 to 0.812 inches may correspond to a pressed IGU having a pressed thickness T of 0.750 inches. As a result, for a pre-pressed IGU 14 having a thickness of 0.800 measured by the displacement transducer 94, the controller 42 sets the distance between the pressing members 96 of the press 34 to press an IGU 14 having a pressed thickness T of 0.750 inches. Typically, IGUs are made in distinct thicknesses. For example, ⅜ inch, ½ inch, 0.0625 inch, ¾ inch, 0.875 inch, 1 inch, etc. IGUs may be made at a particular plant. Each of these discrete thicknesses T has a corresponding range of pre-pressed thicknesses T'. Each IGU thickness T will have an associated range of pre-pressed thicknesses T' that allow the displacement transducer 94 and the controller 42 to determine the IGU thickness being pressed. The controller uses the stored set of ranges of pre-pressed thicknesses T' and corresponding IGU pressed thicknesses to set the spacing between the pressing members.

Figure 8:
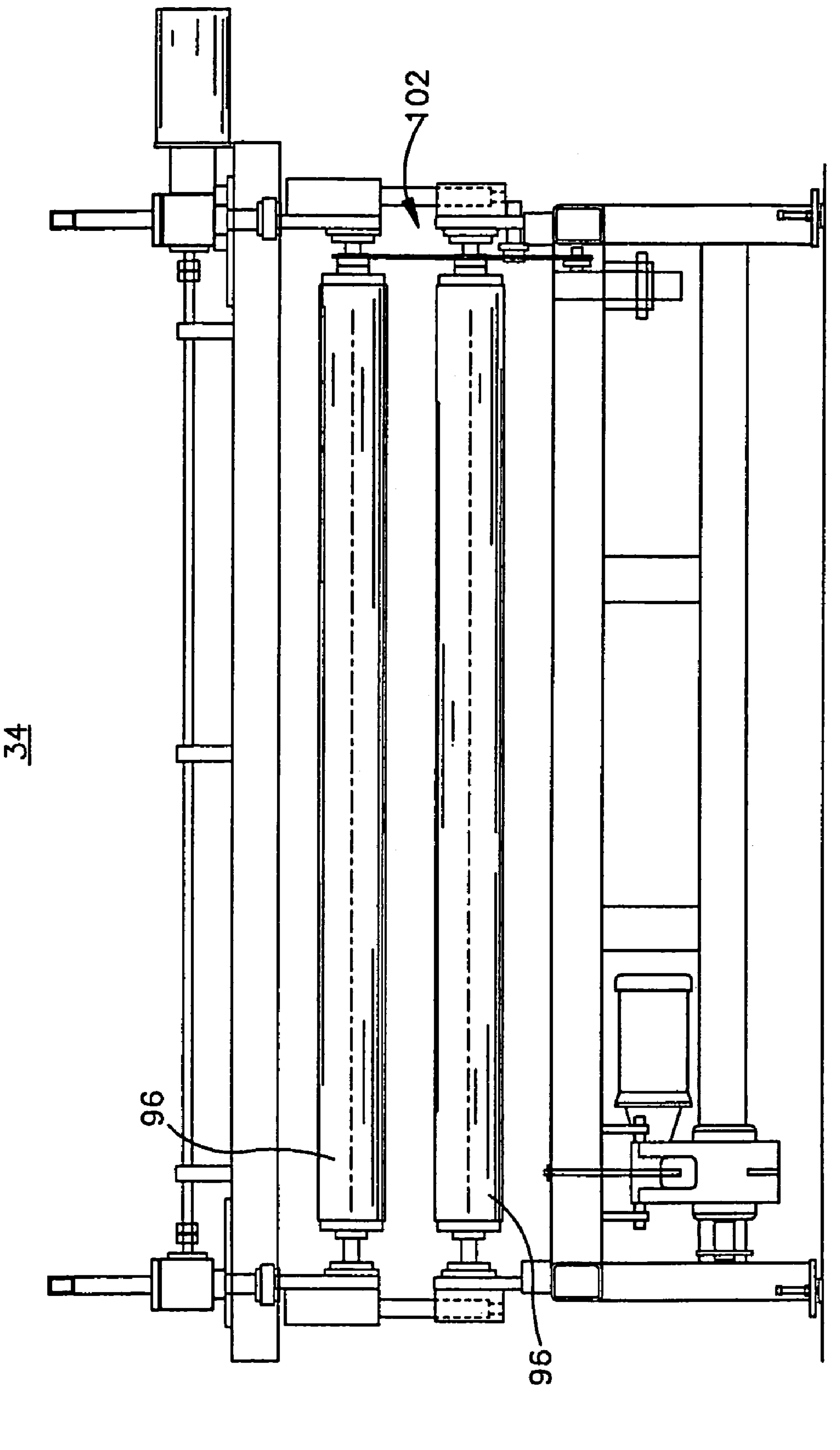
FIG. 8 is a front elevational view of a press for an insulating glass unit.
Figure 9A:
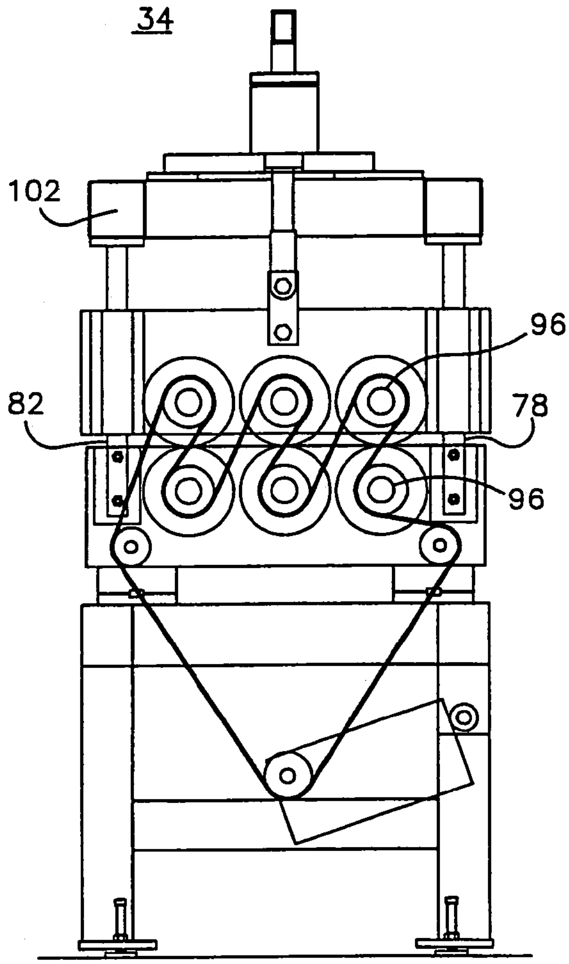
FIG. 9A is a side elevational view of a press for an insulating glass unit with rollers relatively spaced apart by a small distance.
Figure 9B:
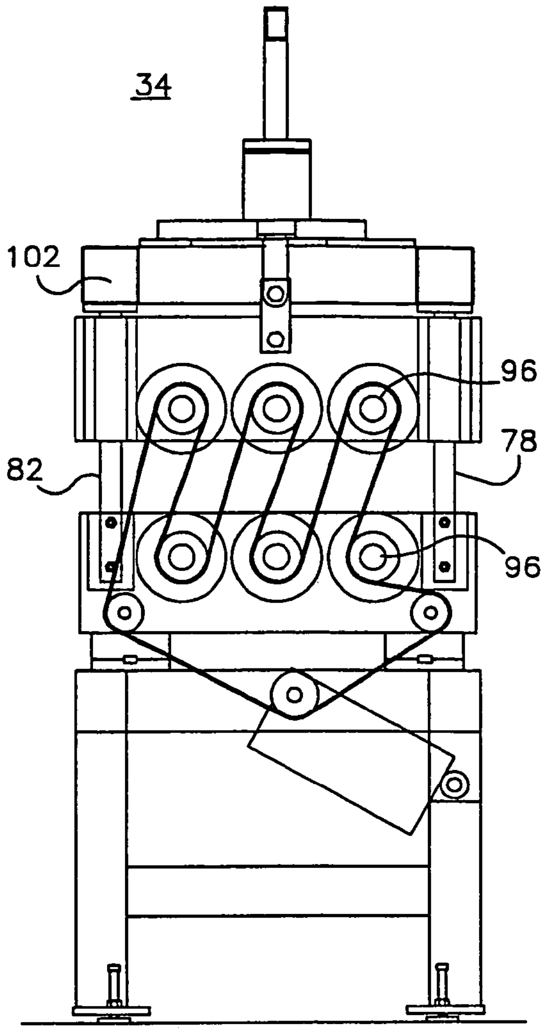
FIG. 9B is a side elevational view of a press for an insulating glass unit with rollers spaced apart by a relatively large distance.

The IGU thickness detection scheme disclosed is compatible with any type of press. The illustrated press 34 includes three pairs of rollers 96 that are spaced apart by a distance controlled by the controller 42. Referring to FIGS. 5 and 7, the three pairs of rollers 96 are rotatably mounted in a cabinet 102. Referring to FIG. 8, the illustrated rollers 96 are elongated and extend across substantially the entire width of the press 34.

In operation, a pre-pressed IGU 14 moves along the conveyor 40 to a position below the detector 36 and into contact with the displacement transducer 94. An optical property or glass type(s) of the IGU 14 is detected with the detector 36. The detected optical property or glass type(s) is indicative of the amount of energy required to heat the sealant 19. The pre-pressed thickness T' of the IGU 14 being processed is measured with the displacement transducer 94. The pre-pressed IGU is moved into the oven 32, between the upper and lower arrays 60, 62 of IR lamps 58. The controller 42 changes a number of lamps in the upper and lower arrays 60, 62 that supply energy to the IGU 14 in response to the detected optical property or glass type(s). The controller compares the measured pre-pressed thickness T' of the IGU 14 with a set of ranges of pre-pressed thicknesses that correspond to a set of IGU pressed thicknesses. The controller then selects one pressed thickness from the set of pressed thicknesses that corresponds to the measured pre-pressed IGU thickness. The controller then adjusts the distance between the adjustable rollers 96 of the press 34 to the selected IGU pressed thickness T. In the exemplary embodiment, the rollers of the press are moved up and down by a screw jack coupled to a servo motor. In one embodiment, a sensor such as a LVDT, is used to monitor the distance between the rollers. The conveyor moves the IGU 14 out of the oven 32 and into the press 34. The rollers 96 of the press 34 rotate to press the IGU 14 to the selected thickness T and move the IGU 14 to the outlet 82 of the press. The outlet conveyor 80 moves the IGU 14 away from the outlet 82 of the press.

Although the present invention has been described with a degree of particularity, it is the intent that the invention include all modifications and alterations falling within the spirit or scope of the appended claims.

I claim:

1. A method of applying energy to sealant of an insulating glass unit, comprising:
- a) detecting an optical property of said insulating glass unit;
- b) positioning said insulating glass with respect to an energy source; and
- c) adjusting an amount of energy supplied by said energy source to said insulating glass unit in response to said detected optical property to adjust an amount of energy applied to said sealant of said insulating glass unit wherein said detected optical property is transmittance.

2. The method of claim 1 wherein said energy source comprises a plurality of infrared lamps and an amount of infrared energy supplied by the lamps is adjusted by changing a number of said infrared lamps that supply energy to said insulating glass unit.

3. The method of claim 1 wherein said insulating glass unit is moved at a uniform speed with respect to said energy source.

4. A method of applying energy to sealant of an insulating glass unit, comprising:
- a) detecting an optical property of said insulating glass unit;
- b) positioning said insulating glass with respect to an energy source; and
- c) adjusting an amount of energy supplied by said energy source to said insulating glass unit in response to said detected optical property to adjust an amount of energy applied to said sealant of said insulating glass unit wherein said detected optical property is reflectivity.

5. The method of claim 4 wherein said energy source comprises a plurality of infrared lamps and an amount of infrared energy supplied by the lamps is adjusted by changing a number of said infrared lamps that supply energy to said insulating glass unit.

6. The method of claim 4 wherein said insulating glass unit is moved at a uniform speed with respect to said energy source.

7. A method of applying energy to heat sealant of an insulating glass unit, comprising:
- a) detecting an optical property of said insulating glass unit;
- b) moving said insulating glass unit at a uniform speed between first and second arrays of infrared lamps; and
- c) changing a number of said infrared lamps that supply energy to said insulating glass unit in response to said detected optical property to adjust an amount of energy supplied to said insulating glass unit in to heat said sealant of said insulating glass unit, wherein said detected optical property is transmittance.

8. The method of claim 7 wherein reflectivity or transmittance of a first pane of said insulating glass unit is detected and a number of lamps of said first array that supply energy is changed in response to said detected reflectively or transmittance of said first pane.

9. The method of claim 7 wherein reflectivity or transmittance of a first pane of said insulating glass unit is detected and a number of lamps of said first array that supply energy is changed in response to said detected reflectivity or transmittance of said first pane and reflectivity or transmittance of a second pane of said insulating glass unit is detected and a number of lamps of said second array that supply energy is changed in response to said detected reflectivity or transmittance of said second pane.

10. A method of applying energy to heat sealant of an insulating glass unit, comprising:

a) detecting an optical property of said insulating glass unit;

b) moving said insulating glass unit at a uniform speed between first and second arrays of infrared lamps; and c) changing a number of said infrared lamps that supply energy to said insulating glass unit in response to said detected optical property to adjust an amount of energy supplied to said insulating glass unit in to heat said sealant of said insulating glass unit, wherein said detected optical property is reflectivity.

11. The method of claim 10 wherein reflectivity of a first pane of said insulating glass unit is detected and a number of lamps of said first array that supply energy is changed in response to said detected reflectivity of said first pane.

12. The method of claim 10 wherein reflectivity of a first pane of said insulating glass unit is detected and a number of lamps of said first array that supply energy is changed in response to said detected reflectivity of said first pane and reflectivity of a second pane of said insulating glass unit is detected and a number of lamps of said second array that supply energy is changed in response to said detected reflectivity of said second pane.

* * * * *